(12) United States Patent
Beard et al.

(10) Patent No.: US 9,764,299 B2
(45) Date of Patent: Sep. 19, 2017

(54) MIXING AND DISTRIBUTION DEVICE WITH MIXING AND EXCHANGE ZONES

(71) Applicant: IFP Energies nouvelles, Rueil-Malmaison (FR)

(72) Inventors: Philippe Beard, Saint Genis-Laval (FR); Frederic Bazer-Bachi, Irigny (FR); Cecile Plais, Les Haies (FR); Frederic Augier, Saint Symphorien d Ozon (FR); Yacine Haroun, Davis, CA (US); Jauffray Delteil, Moisselles (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/085,466

(22) Filed: Mar. 30, 2016

(65) Prior Publication Data
US 2016/0288073 A1 Oct. 6, 2016

(30) Foreign Application Priority Data

Apr. 1, 2015 (FR) ..................................... 15 52783

(51) Int. Cl.
*B01J 8/04* (2006.01)

(52) U.S. Cl.
CPC ........... *B01J 8/0492* (2013.01); *B01J 8/0446* (2013.01); *B01J 8/0453* (2013.01); *B01J 8/0496* (2013.01); *B01J 2208/00362* (2013.01); *B01J 2208/00849* (2013.01); *B01J 2208/00938* (2013.01); *B01J 2208/027* (2013.01)

(58) Field of Classification Search
CPC ...... B01J 8/0453; B01J 8/0492; B01J 8/0496; B01J 8/0446; B01J 2208/00938; B01J 2208/00362; B01J 2208/00849
See application file for complete search history.

(56) References Cited

U.S. PATENT DOCUMENTS

| | | |
|---|---|---|
| 7,122,162 B2 | 10/2006 | Raynal et al. |
| 8,337,787 B2 | 12/2012 | Augier et al. |
| 2002/0187086 A1 | 12/2002 | Raynal et al. |
| 2011/0123410 A1 | 5/2011 | Augier et al. |
| 2015/0328610 A1 | 11/2015 | Zahirovic et al. |

FOREIGN PATENT DOCUMENTS

| | | |
|---|---|---|
| FR | 2824495 A1 | 11/2002 |
| FR | 2952835 A1 | 5/2011 |
| WO | 2014122073 A1 | 8/2014 |
| WO | 2014210276 A1 | 12/2014 |

OTHER PUBLICATIONS

Search Report for related French Application No. 1552783 dated Feb. 2, 2016.

*Primary Examiner* — Lessanework Seifu
(74) *Attorney, Agent, or Firm* — Millen, White, Zelano and Branigan, P.C.

(57) ABSTRACT

Device for the mixing and distribution of fluids for a catalytic reactor with a downward flow, said device comprising at least one collection zone (A), at least one mixing zone (B) comprising at least one enclosure (15) for the mixing of the fluids, at least one distribution zone (C), characterized in that said mixing zone (B) is situated at the same level as the distribution zone (C) and also comprises at least one enclosure (16) for the exchange of the fluids, connected to, and communicating with, said mixing enclosure (15), said exchange enclosure (16) comprising at least one lateral passage section (17a, 17b) suitable for the passage of the fluids from said exchange enclosure (16) to said distribution zone (C).

15 Claims, 4 Drawing Sheets

FIG.1

PRIOR ART

MIXING AND DISTRIBUTION DEVICE WITH MIXING AND EXCHANGE ZONES

TECHNICAL FIELD

The present invention relates to the field of exothermic reactions and more particularly to hydrotreatment, hydrodesulphurization, hydrodenitrogenation, hydrocracking, hydrogenation, hydrodeoxygenation or also hydrodearomatization reactions carried out in a fixed-bed reactor. The invention relates more particularly to a device for the mixing and distribution of fluids in a reactor with a co-current downward flow and its use for carrying out exothermic reactions.

STATE OF THE ART

Exothermic reactions carried out for example in refining and/or in petrochemistry need to be cooled down by an additional fluid, called quench fluid, in order to avoid a thermal runaway of the catalytic reactor in which they are carried out. The catalytic reactors used for these reactions generally comprise at least one solid catalyst bed. The exothermic nature of the reactions requires the maintenance of a homogeneous temperature gradient within the reactor in order to avoid the presence of hot spots in the catalyst bed contained in the reactor. Zones that are too hot can prematurely reduce the activity of the catalyst and/or lead to non-selective reactions and/or lead to thermal runaways. It is therefore important to have at least one mixing chamber in a reactor, situated between two catalyst beds, which allows a homogeneous temperature distribution of the fluids over a section of the reactor and cooling down of the reaction fluids to a desired temperature.

In order to carry out this homogenization, it is often necessary for a person skilled in the art to use a specific arrangement of often complex internals including the most homogeneous possible introduction of the quench fluid into the section of the reactor. For example, document FR 2 824 495 A1 describes a quench device making it possible to ensure an efficient exchange between the quench fluid(s) and the process fluid(s). This device is integrated in an enclosure and comprises a quench fluid injection pipe, a baffle for collecting the fluids, the quench box proper, operating the mixing between the quench fluid and the downward flow, and a distribution system composed of a perforated tray and a distribution plate. The quench box comprises a deflector ensuring the vortex motion of the fluids in a direction substantially non-radial and non-parallel to the axis of said enclosure and downstream of the deflector, in the direction of circulation of the reaction fluid, at least one outlet passage section for the mixture of fluids formed in the box. This device makes it possible to overcome certain drawbacks of the different systems of the prior art but still has a large space requirement.

In order to overcome the problem of the space requirement, a device for mixing fluids in a reactor with a downward flow has been developed, and is described in the document FR 2 952 835 A1. This device comprises a horizontal collection means provided with a vertical collection line for receiving the fluids, an injection means placed in the collection line, and an annular mixing chamber with a circular cross-section situated downstream of the collection means in the direction of circulation of the fluids. The mixing chamber comprises an inlet end connected to the collection line and an outlet end allowing the passage of the fluids, as well as a horizontal pre-distribution plate comprising at least one chimney. The advantage of this device is that it is more compact than that described previously, and makes it possible to ensure good mixing of the fluids and good temperature homogeneity.

A purpose of the invention is to propose a mixing device and a distribution device for fluids, which have a small space requirement when they are placed in a catalytic reactor. Another purpose of the present invention is to propose a mixing and distribution device having good efficiency for mixing fluids and having good temperature homogeneity and good distribution.

The Applicant has developed a combined device for the mixing and distribution of fluids, making it possible to significantly reduce the space dedicated to the mixing and distribution of fluids, in particular in a reactor with a downward flow.

SUBJECTS OF THE INVENTION

A first subject of the invention relates to a device for the mixing and distribution of fluids for a catalytic reactor with a downward flow, said device comprising:
- at least one collection zone (A) comprising at least one collection means;
- at least one substantially vertical collection line suitable for receiving a reaction fluid collected by said collection means and at least one injection means opening into said collection line for injecting a quench fluid;
- at least one mixing zone (B), situated downstream of said collection line in the direction of circulation of the fluids and communicating with said collection line, said mixing zone (B) comprising at least one enclosure for mixing the fluids;
- at least one distribution zone (C), situated downstream of said mixing zone (B) in the direction of circulation of the fluids, comprising a distribution plate supporting a plurality of chimneys;

characterized in that said mixing zone (B) is situated at the same level as the distribution zone (C) and also comprises at least one enclosure for the exchange of the fluids connected to, and communicating with, said mixing enclosure, said exchange enclosure comprising at least one lateral passage section suitable for the passage of the fluids from said exchange enclosure to said distribution zone (C).

Advantageously, said mixing enclosure is situated above said exchange enclosure.

Preferably, the cumulative total height H'2 of said mixing enclosure and of said exchange enclosure is comprised between 200 and 800 mm.

Advantageously, the width W of said exchange enclosure is comprised between 200 and 800 mm.

Preferably, the section of said mixing enclosure and/or of said exchange enclosure is a parallelogram.

Preferably, the volume ratio between said exchange enclosure and said mixing enclosure is comprised between 5 and 60%.

Advantageously, the lateral passage sections are distributed over at least two levels.

Advantageously, said mixing enclosure and said exchange enclosure form a single piece.

Preferably, the device according to the invention comprises a fluid dispersal system arranged below said distribution plate, said dispersal system comprising at least one fluid dispersal means.

Advantageously, said dispersal means is a grid, the axis of said grid being perpendicular to the longitudinal axis of the enclosure of the reactor.

Preferably, said mixing enclosure is positioned between two exchange enclosures.

Preferably, said mixing enclosure comprises at least one deflecting means on at least one of the internal wall(s) of said mixing enclosure.

Advantageously, said exchange enclosure comprises a plurality of horizontal passage sections suitable for the passage of the fluids from said exchange zone to the distribution plate.

Preferably, the enclosure or enclosures and/or the one(s) closest to the distribution plate is (are) situated at a distance "d" from said distribution plate comprised between 20 and 150 mm.

Another subject of the invention relates to a catalytic reactor with a downward flow comprising an enclosure containing at least two fixed catalyst beds separated by an intermediate zone comprising a device for the mixing and distribution of fluids according to the invention.

DETAILED DESCRIPTION OF THE INVENTION

The compact mixing and distribution device according to the invention is used in a reactor in which exothermic reactions are carried out, such as hydrotreatment, hydrodesulphurization, hydrodenitrogenation, hydrocracking, hydrogenation, hydrodeoxygenation or also hydrodearomatization reactions. Generally, the reactor has a shape that is elongated along a substantially vertical axis. At least one reaction fluid (also called "process fluid") is circulated from the top to the bottom of said reactor through at least one catalyst fixed bed. Advantageously, at the outlet of each bed with the exception of the last, the reaction fluid is collected, then mixed with a quench fluid in said device before being distributed to the catalyst bed situated downstream of a distribution plate.

Downstream and upstream are defined with respect to the direction of flow of the reaction fluid. The reaction fluid can be a gas or a liquid or a mixture containing liquid and gas; this depends on the type of reaction carried out in the reactor.

For better understanding of the invention, the description given hereinafter by way of an example of application relates to a mixing and distribution device used in a reactor suitable for hydrotreatment reactions. The description of FIG. 1 relates to a mixing and distribution device according to the prior art, the description of FIGS. 2 to 5 relates to a mixing and distribution device according to the invention. FIGS. 2 to 5 retain certain elements of FIG. 1; the references in FIGS. 2 to 5 which are identical to those of FIG. 1 denote the same elements. Of course, the device according to the invention can be used, without exceeding the scope of the invention, in any reactor or device and in any field in which it is desirable to obtain good material or thermal mixture and good distribution of fluids.

Figure 1:
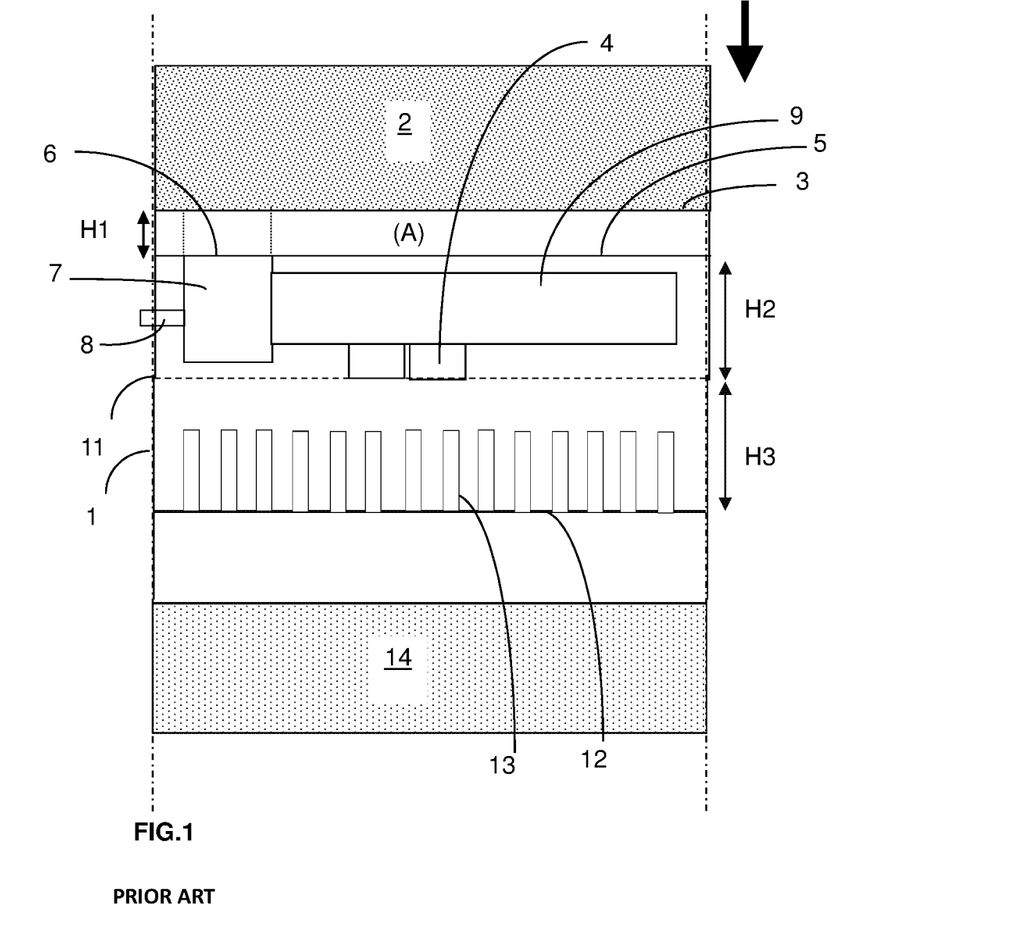
FIG. 1 shows an axial cross-section of a catalytic reactor with a downward flow comprising at least two solid catalyst beds, and comprising a compact device for the mixing and distribution of fluids according to the prior art. The arrow in bold represents the direction of flow of the fluids in the reactor.

FIG. 1 shows a mixing and distribution device according to the prior art arranged in a reactor 1 with a shape that is elongated along a substantially vertical axis in which at least one reaction fluid is circulated from the top to the bottom through two catalyst beds 2 and 14. The reaction fluid can be a gas (or a gas mixture) or a liquid (or a liquid mixture) or a mixture containing liquid and gas. The mixing and distribution device is arranged below the catalyst bed 2, with respect to the flow of the reaction fluid in the enclosure 1. A support grid 3 makes it possible to support the catalyst bed 2 in such a way as to free a collection space (A) (also called collection zone) below the latter. The height H1 of the collection space (A) is typically between 10 and 300 mm. This collection space or collection zone (A) makes it possible to collect the flow originating from the catalyst bed 2 at the level of the collection means 5. The collections means 5, also called a baffle, is a solid plate open only at a position 6 in order to drain the flow of the fluid to an annular mixing chamber 9. The reaction fluid originating from the bed 2 is thus forced in the collection zone (A) to pass through the vertical collection line 7 which communicates with the opening 6. A quench fluid is injected into the collection line 7 via an injection line 8. The quench fluid can be liquid or gaseous or a mixture containing liquid or gas. Said annular chamber 9 is connected by its inlet end to the collection line 7. The quench fluid and the reaction fluid originating from the upper bed 2 are thus forced to enter said annular chamber 9 in which they mix while undergoing a rotary flow. At the outlet of said chamber, the mixture of the fluids flows over the pre-distribution plate 11 situated downstream of the annular mixing chamber 9, in the direction of circulation of the fluids. Typically, the height H2 (cf. FIG. 1) measured between the collection means 5 and the pre-distribution plate 11 is comprised between 300 and 600 mm. The annular mixing chamber 9 is positioned at the periphery of the reactor. The gas and liquid phases of the mixture are separated on the perforated plate 11, which is provided with one or more central chimneys 4 configured in order to allow the passage of gas. The liquid passes through the perforations of the plate in order to form a shower-head or rain type flow. The role of the perforated plate 11 is to distribute the flow leaving the annular mixing chamber 9 in order to supply the distribution plate 12 in a relatively balanced manner, said distribution plate 12 being positioned downstream of the pre-distribution plate, in the direction of circulation of the fluids. Typically, the height H3 (cf. FIG. 1) measured between the pre-distribution plate 11 and the distribution plate 12 is comprised between 100 and 700 mm. The distribution plate 12 comprises chimneys 13, the role of which is to redistribute the gas and liquid phases at the inlet of the catalyst bed 14 situated downstream of this distribution plate.

The mixing and distribution device according to the prior art thus comprises a mixing zone and a distribution zone positioned one above the other, in a stacked manner. The mixing of the fluids is carried out over a height H2 and the distribution of the fluids is carried out over a height H3. As a result, the total space requirement H in the enclosure 1 of a mixing and distribution device according to the prior art is equal to H1+H2+H3 (cf. FIG. 1).

The applicant has developed a new device for the mixing and distribution of fluids which is more compact than that described previously, having good mixing of the fluids and good distribution over the catalyst bed situated below said devices.

Figure 2:
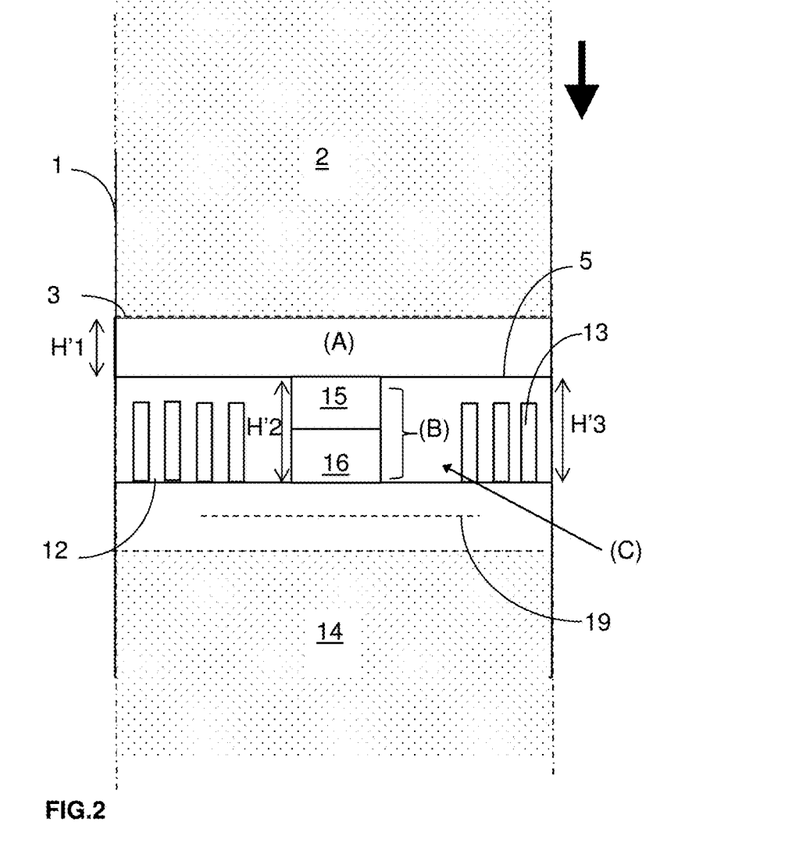
FIG. 2 shows an axial cross-section of a catalytic reactor with a downward flow comprising at least two solid catalyst beds, and comprising a compact device for the mixing and distribution of fluids according to the invention. The arrow in bold represents the direction of flow of the fluids in the reactor.
Figure 3A:
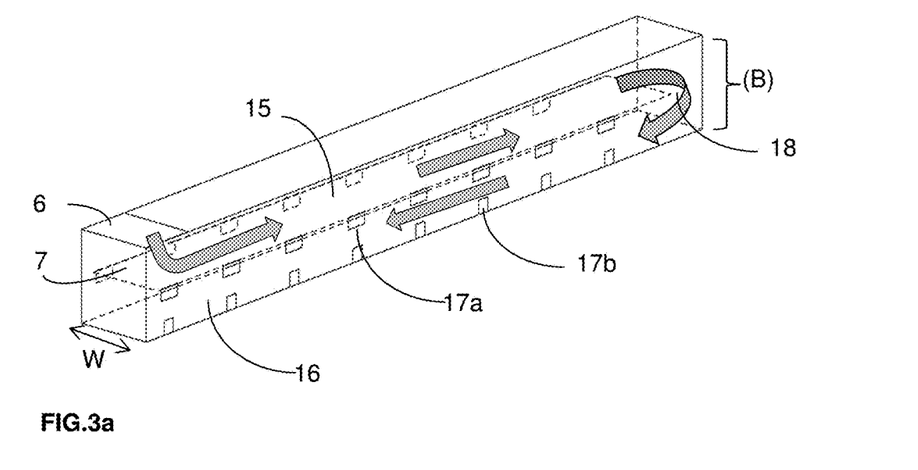
FIG. 3a shows a detailed view of the mixing zone (B) of the device according to the invention (the hachured lines show the parts of the mixing zone (B) that are not visible, i.e. are located inside said zone). The arrows represent the direction of flow of the fluids in the mixing zone.
Figure 3B:
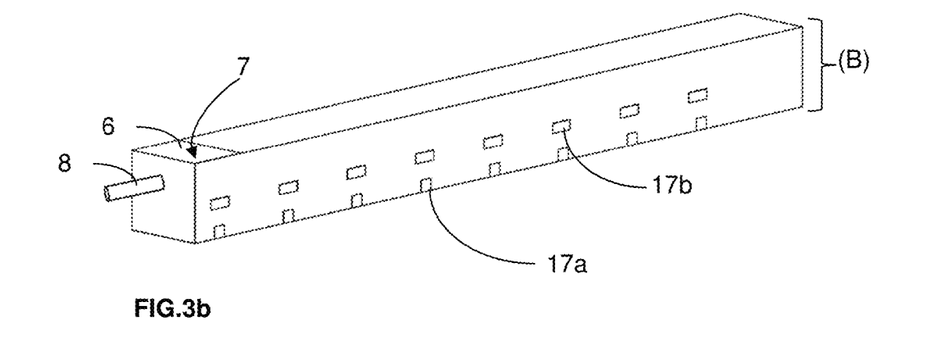
FIG. 3b is a perspective view of the mixing zone (B) of the device according to the invention.

With reference to FIGS. 2, 3a and 3b, the mixing and distribution device according to the invention can be arranged in a reactor 1, having an elongated shape along a substantially vertical axis, in which at least one reaction fluid is circulated from the top to the bottom through at least one catalyst bed 2. The device according to the invention is arranged below the catalyst bed 2, with respect to the flow of reaction fluid in the enclosure 1. A support grid 3 makes it possible to support the catalyst bed 2 in such a way as to free a collection zone (A) arranged below the catalyst bed 2. The collection zone (A) is necessary to allow the reaction fluid to drain to a collection line 7 (cf. FIGS. 3a and 3b). The reaction fluid that flows is for example composed of a gas phase and a liquid phase. More particularly, the reaction fluid passing through the catalyst bed 2 upstream is collected by a substantially horizontal collection means 5 (also called a collection baffle) leading to a substantially vertical collection line 7, arranged either below the collection zone (A) at the level of a zone called mixing zone (B) (as shown in FIG. 3b), or at the level of the collection zone (A) (not shown in the figures). By substantially vertical and substantially horizontal is meant within the meaning of the present invention a variation of a plane with the vertical, respectively the horizontal, by an angle α comprised between ±5 degrees. The collection means 5 (cf. FIG. 2) is constituted by a solid plate arranged in the plane perpendicular to the longitudinal axis of the enclosure below the support grid 3 of the catalyst bed 2. The plate of the collection means 5 extends radially over the entire surface of the reactor 1. It comprises at one of its ends an opening 6 (cf. FIGS. 3a and 3b) to which said collection line 7 is connected. The collection means 5 make it possible to collect the flow of reaction fluid originating from the catalyst bed 2 upstream and to direct it to said collection line 7. The collection means 5 are distant from the support grid 3 of the catalyst bed 2 by a height H'1 (FIG. 2). The height H'1 is chosen so as to limit the pressure drop during collection of the fluid flowing from the catalyst bed 2 and to limit the clearance height, i.e. the height formed by the accumulated liquid in the collection means 5. The clearance height does not alter the drainage of the reaction fluid to the collection line 7, or its flow in this line, or its flow through the upper catalyst bed 2. When the collection line 7 and the injection means 8 (FIG. 3b) are situated at the level of the mixing zone (B), the height H'1 is comprised between 10 and 200 mm, preferably between 30 and 150 mm, yet more preferably between 40 and 100 mm. Thus, the reaction fluid originating from the bed 2 is forced in the collection zone (A) to pass through the collection line 7.

When the collection line 7 and the injection means 8 are situated at the level of the collection zone (A), the height H'1 is comprised between 10 and 400 mm, preferably between 30 and 300 mm, and yet more preferentially between 50 and 250 mm.

Below the collection zone (A) is a mixing zone (B), and a distribution zone (C). With reference to FIGS. 3a and 3b, the mixing zone (B) comprises a substantially vertical collection line 7 suitable for receiving the reaction fluid collected by the collection means 5 and the quench fluid originating from the injection means 8 (cf. FIG. 3b) opening into said collection line 7.

The mixing zone (B) also comprises a mixing enclosure 15 (cf. FIGS. 2 and 3a) situated downstream of the collection means 5 in the direction of circulation of the fluids. The collection line 7, which communicates with the mixing enclosure 15, can be situated above the mixing enclosure 15 or at the same level as said enclosure. Preferably, the collection line 7 is situated at the same level as the mixing enclosure 15 (cf. in particular FIG. 3a). Similarly, the injection line 8 can open above the mixing enclosure 15, at the same level as said enclosure, or directly to the inside of said mixing enclosure 15 via a device known to a person skilled in the art, for example a perforated tube passing through the mixing zone 15. The injection of the quench fluid can be carried out via co-current, cross-current, or even counter-current with respect to the reaction fluid originating from the collection zone (A).

The distribution zone (C) itself comprises a distribution plate 12 supporting a plurality of chimneys 13.

A characteristic of the present invention is based on placing the mixing zone (B) at the same level as the distribution zone (C), and in that said mixing zone (B) is constituted by an enclosure 15 for mixing the fluids, connected to, and communicating with, a enclosure 16 for the exchange of the fluids (cf. FIGS. 2 and 3a), the exchange enclosure 16 being situated downstream of the mixing enclosure 15 in the direction of the circulation of the fluids. Within the meaning of the invention, by mixing enclosure 15 is meant the space in which the reaction fluid and the quench fluid are mixed. By exchange enclosure 16 is meant the space in which the reaction fluid and the quench fluid are in direct contact with the distribution zone (C) via the lateral passage sections 17a and/or 17b (described hereinafter).

The configuration of the mixing zone (B) allows the mixing of the fluids in the mixing enclosure 15 and the flow of said mixture to the exchange enclosure 16. The mixing of the reaction fluid and the quench fluid continues to take place at the level of the exchange enclosure 16. With reference to FIGS. 3a and 3b, the exchange enclosure 16 comprises at least one lateral passage section 17a or 17b suitable for the passage of the fluids from the mixing zone (B) to the distribution zone (C). Preferably, the mixing zone 16 comprises at least two lateral passage sections 17a and 17b. Thus, only the exchange enclosure 16 is in direct contact with the distribution zone (C). The lateral passage sections 17a allow in particular the passage of the liquid from the exchange enclosure 16 to the distribution zone (C) and the lateral passage sections 17b allow in particular the passage of the gas from the exchange enclosure 16 to the distribution zone (C).

The section of the mixing enclosure 15 and that of the exchange enclosure 16 can be a four-sided section, preferably a trapezoidal section and more preferentially a parallelogram section or a circular section. By trapezoidal section is meant any four-sided section of which two opposite sides of said section form a parallel pair. By parallelogram section is meant any four-sided section of which the opposite sides of said section form a parallel pair, for example the parallelogram section can be a rectangular, square or rhomboid section. By circular section is meant a section in the form of a circle or oval. Regardless of the shape of the section of the mixing enclosure 15 and of the exchange enclosure 16, the height or the diameter of said chamber will be chosen so as to limit the pressure drop as far as possible and so as to limit the space requirement in the reactor. Advantageously, the section of the mixing enclosure 15 and of the exchange enclosure 16 is rectangular (cf. FIGS. 2 to 5). The rectangular section of the enclosures, apart from facilitating mechanical feasibility, allows their manufacture and partial assembly outside the reactor, while allowing their subsequent easy insertion into the reactor. The section of the mixing enclosure 15 can be different from the section of the exchange enclosure 16 (cf. FIGS. 4b, 4c, 4e, and 4f).

The mixing enclosure 15 and the exchange enclosure 16 can be any shape whatsoever. The walls of the mixing enclosure 15 and of the exchange enclosure 16 can in particular extend in a straight line ("I" shape) or can be curved ("C" shape) or also have angles ("L" shape). The mixing zone (B) can be situated at any location in the distribution zone (C). For example, the mixing zone (B) can be positioned at the centre of the distribution zone (C) or can be offset from the latter position. Thus, the length of the mixing and exchange enclosures is determined by a person skilled in the art, depending on their position in the enclosure of the reactor 1. Advantageously, the ends of the mixing 15 and exchange 16 enclosures are not in contact with the wall of the enclosure of the reactor 1, so as to allow the circulation of the fluids over the distribution plate 12 on either side of the mixing 15 and exchange 16 enclosures.

In an embodiment according to the invention, the mixing enclosure 15 is situated above said exchange enclosure 16 (as shown in FIGS. 2, 3a and 3b). The mixing enclosure 15 can also be situated below said exchange enclosure 16 (cf. FIG. 4a). In another embodiment according to the invention, the mixing zone (B) can comprise a mixing enclosure 15 and a plurality of exchange enclosures 16. For example, the exchange enclosures 16 can be positioned on either side of the mixing enclosure 15 (cf. FIG. 4c). At least one opening 18 (cf. FIG. 3a) is arranged in the mixing zone (B) in order to allow the passage of the mixture of the fluids from the mixing enclosure 15 to the exchange enclosure 16. The position, shape and dimension of the opening are chosen by a person skilled in the art in order to limit the pressure drop during the flow of the mixture of the fluids.

Advantageously, the mixing enclosure 15 and the exchange enclosure(s) 16 constitute a single piece.

Figure 4A:
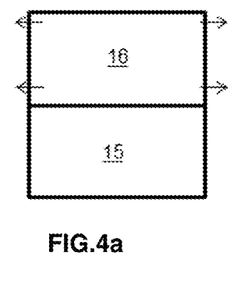
FIGS. 4a to 4f show various alternatives for the position of the mixing and exchange enclosures of the mixing zone (B) of the device according to the invention. The arrows represent the directions of flow of the fluids to the distribution zone (C).
Figure 4B:
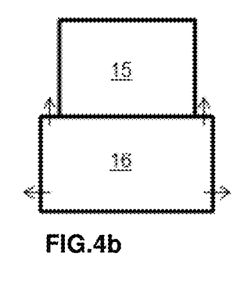
Figure 4C:
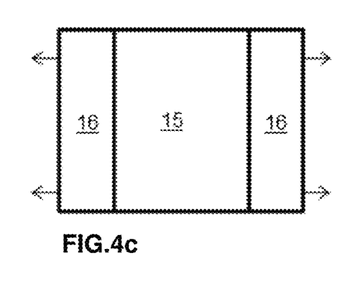
Figure 4D:
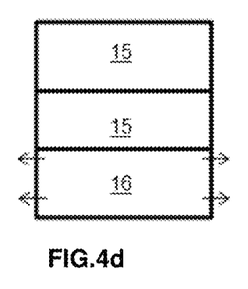
Figure 4E:
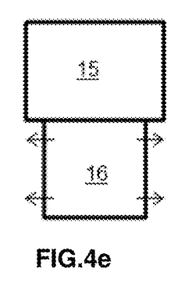
Figure 4F:
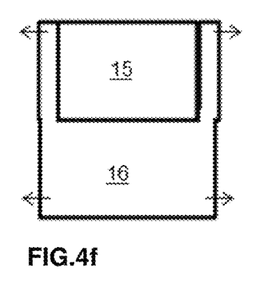
Figure 5:
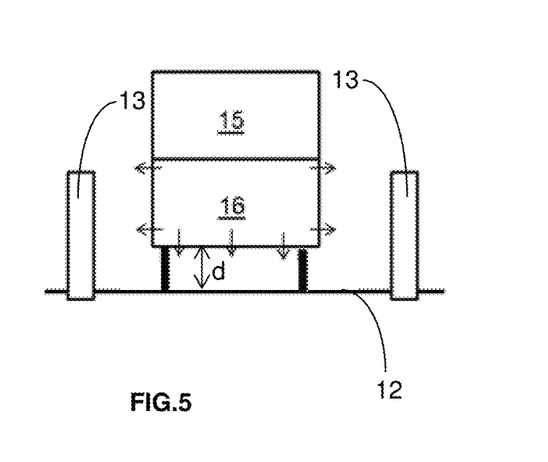
FIG. 5 shows a particular embodiment of the device according to the invention, in which the exchange enclosure is situated at a distance "d" from the distribution plate. The arrows show the directions of flow of the fluids from the exchange enclosure to the distribution zone (C).

In another embodiment of the invention, the mixing enclosure 15 can comprise one or more levels (two levels in the context of FIG. 4d). When the mixing chamber 15 comprises several levels, the passage of the fluids from one level to another is carried out via at least one passage section (not shown in FIG. 4d) of the perforated or slotted type; the surface of said passage section being chosen so as to disturb the flow of the fluids without thereby causing a significant pressure drop. The position, shape and dimension of the passage section(s) between two levels of the mixing zone 15 is (are) chosen by a person skilled in the art so as to limit the pressure drop during the flow of the mixture of the fluids.

According to the invention, the cumulative total height H'2 of said mixing enclosure 15 and of said exchange enclosure 16 is comprised between 200 and 800 mm, preferably between 300 and 750 mm, and even more preferentially between 350 and 700 mm.

Preferably, the width "W" (cf. FIG. 3a) of the exchange enclosure 16 is comprised between 200 and 800 mm, preferably between 250 and 700 mm, and even more preferentially between 300 and 600 mm.

The volume ratio (in %) between the exchange enclosure(s) 16 and the mixing enclosure 15 is comprised between 5 and 60%, preferably between 10 and 40%.

The distribution zone (C), extending over a height H'3 (cf. FIG. 2), comprises a distribution plate 12 (also referred to herein as distributor plate) and a plurality of chimneys 13. More precisely, the chimneys 13 are open at their upper end through an upper opening and have a series of lateral holes along their lateral wall (not shown in the figures), intended for the liquid phase (via the holes) and the gas phase (via the upper opening) to pass separately into the chimneys, so as to mix them thoroughly inside said chimneys. The shape of the lateral holes can be very varied, generally circular or rectangular, these holes being preferentially distributed over each of the chimneys on several levels that are substantially identical from one chimney to another, generally at least one level, and preferably from 1 to 10 levels, so as to allow an interface to be established between the gas phase and the liquid phase that is as regular as possible.

Compared with the mixing and distribution device of the prior art, the mixing and distribution device according to the invention does not comprise a pre-distribution plate 11 provided with chimneys. According to an essential aspect of the device according to the invention, the mixing zone (B) is positioned at the same level as the distribution zone (C). The mixing and distribution device according to the invention is thus significantly more compact compared with those known from the prior art. Compared with the device according to the prior art, as shown in FIG. 1, the total space requirement of the mixing and distribution device according to the invention is H=H'1+H'3 (cf. FIG. 2).

In an embodiment according to the invention, the enclosure or enclosures 15 or 16 nearest to the distribution plate 12 is (are) placed directly on the distribution plate 12 (cf. FIG. 2).

In another embodiment (cf. FIG. 5), the enclosure or enclosures 15 and/or 16 nearest to the distribution plate 12 is (are) situated at a distance "d" from said distribution plate 12, preferably comprised between 20 and 150 mm, and more preferentially comprised between 30 and 80 mm. The space comprised between the distribution plate 12 and the enclosure or enclosures 15 and/or 16 allows the distribution of the fluids over the entire surface of the distributor plate 12 and thus makes it possible to homogenize the distribution of the mixture of the fluids over the entire section of the reactor above the catalyst bed 14 situated downstream of the mixing and distribution device, in the direction of circulation of the fluids. In this embodiment, the exchange enclosure 16 can comprise in its lower part longitudinal passage sections (not shown in FIG. 5), so that the mixture of the fluids can flow towards the distribution plate 12 (the flow of the fluids being represented by horizontal arrows in FIG. 5).

Alternatively, when the exchange enclosure 16 is placed directly on the distribution plate 12, said exchange enclosure can comprise in its lower part longitudinal passage sections (not shown in the figures), so that the mixture of the fluids can pass directly through the distribution plate 12. Of course, the number, shape and size of the longitudinal passage sections are chosen so that a minority fraction of the flow of the mixture of fluids passes through said longitudinal passage sections. The longitudinal passage sections can equally well have the shape of holes and/or slots.

Preferably, the mixing enclosure 15 can comprise at least one deflecting means (not shown in the figures) on at least one of the internal wall(s) of said mixing enclosure. The presence of at least one means of deflecting the mixture of fluids passing through said mixing enclosure 15 makes it possible to increase the exchange surface between the two phases and thus the efficiency of the transfers of heat and of material between the liquid and/or gaseous phases passing through said mixing enclosure 15. Said deflecting means can be presented in several geometrical shapes, making it possible to improve the efficiency of the mixing enclosure, it being understood that said shapes allow at least a partial deflection of the path of the mixture of fluids passing through said exchange enclosure 15. For example, the deflecting means can be presented in the form of a chicane, having a triangular, square, rectangular, ovoid section or any other shape of section. The deflecting means can also be presented in the form of one or more fin(s), or one or more fixed vane(s) or a grid.

Below the distribution plate 12, a dispersal system can be positioned so as to distribute the fluids uniformly over the catalyst bed 14 situated downstream of said system. The dispersal system can comprise one or more dispersal devices 19 (cf. FIG. 2) capable of being associated with each chimney 13, being common to several chimneys 13, or also common to all of the chimneys 13 of the distribution plate 12. Each dispersal device 19 has a substantially planar and horizontal geometry, but can have a perimeter of any shape. Moreover, each dispersal device 19 can be situated at different heights. Advantageously, said dispersal device is presented in the form of grids, and/or can optionally comprise deflectors. Advantageously, the axis of the grid(s) 19 is preferentially perpendicular to the longitudinal axis of the enclosure of the reactor so as to improve the distribution of the mixture of the fluids over the entire radial section of the enclosure of the reactor. The distance separating the dispersal system from the bed of granular solids situated immediately below is chosen so as to retain the state of the mixture of the gaseous and liquid phases as far as possible as it is at the outlet of the chimneys 13.

Preferably, the distance between the distribution plate 12 and catalyst bed 14 situated below said distribution plate is comprised between 50 and 400 mm, preferably between 100 and 300 mm. The distance between the distribution plate 12 and said dispersal device 19 is comprised between 0 and 400 mm, preferably between 0 and 300 mm.

In a particular embodiment, the distribution plate 12 is placed on the dispersal device 19.

Compared with the devices described in the prior art, and even more particularly compared with the device disclosed in the document FR 2 952 835, the mixing and distribution device according to the invention has the following advantages:

an increased compactness due to the integration at the same location of the mixing zone and the distribution zone of the fluids.

good thermal efficiency and good mixing efficiency by means of the flow of the mixture of the fluids into a mixing zone comprising a mixing enclosure, optionally including means for deflecting the fluids, and one or more exchange enclosure(s) situated at the level of the distribution plate.

Example

In the following examples, the device not according to the invention (Device A) is compared with a device according to the invention (Device B). For both devices, it is assumed that the height H1 of the collection space (A) is identical and equal to 120 mm. Similarly, the collection line 7 and the injection means 8 are situated at the same level as the mixing zone (B). In the same way, the height between the distribution plate 12 and the top of the catalyst bed 14 is fixed at 400 mm. Comparisons between these two devices are based on their compactness in a catalytic reactor. These examples are given here by way of illustration and in no way limit the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 15/52.783, filed Apr. 1, 2015 are incorporated by reference herein.

Device A (not According to the Invention):

For a reactor with an internal diameter of 5 m, the space requirement of a conventional mixing device, such as disclosed in the document FR 2 952 835 A1, comprised between the upper end of the collection line 7 and the pre-distribution plate 11, is approximately 650 mm (corresponding to the height H2). The total space requirement is approximately 950 mm when the space requirement of the distribution plate 12 situated below the pre-distribution plate 11 (corresponding to a height H3=300 mm) is added.

Thus, the total space requirement of a conventional mixing and distribution device taken between the bottom of the first catalyst bed 2 and the top of the second catalyst bed 14 is 120+950+400=1470 mm.

Device B (According to the Invention):

For a reactor with a diameter of 5 m, the height of the distribution and mixing device according to the invention, comprised between the upper end of the collection line 7 and the pre-distribution plate 12, is 450 mm (corresponding to the height H'3). The mixing zone (B) is constituted by a mixing enclosure 15 comprising two levels each 150 mm high, and an exchange enclosure 16 of height 150 mm (corresponding to a height H'2 of 150+150+150=450 mm). The width "W" of the mixing enclosure 15 and of the exchange enclosure 16 is 400 mm. The exchange enclosure 16 is connected to the distribution plate (C) via lateral passage sections 17a and 17b situated between 0 and 10 mm above the plate (for the passage sections 17b) and 130 and 140 mm above the plate (for the passage sections 17a). Thus, the total space requirement of the mixing and distribution device according to the invention measured between the bottom of the first catalyst bed 2 and the top of the second catalyst bed 14 is 120+450+400=970 mm.

Thus, by way of comparison, the device according to the invention allows a space saving of 34% compared with the device A. The space saved by the compactness of the device according to the invention compared with the device of the prior art can thus be used for the catalyst beds. Thus the device according to the invention also allows an improvement in the performance of a reactor by increasing the quantity of catalyst in the catalyst beds, while still being manufactured and installed more easily than the same device according to the prior art.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Device for the mixing and distribution of fluids for a catalytic reactor with a downward flow, said device comprising:
- at least one collection zone (A) comprising at least one collection means (5);
- at least one substantially vertical collection line (7) suitable for receiving a reaction fluid collected by said collection means (5) and at least one injection means (8) opening into said collection line (7) for injecting a quench fluid;
- at least one mixing zone (B), situated downstream of said collection line (7) in the direction of circulation of the fluids and communicating with said collection line (7), said mixing zone (B) comprising at least one enclosure for mixing the fluids (15);
- at least one distribution zone (C), situated downstream of said mixing zone (B) in the direction of circulation of the fluids, comprising a distribution plate (12) supporting a plurality of chimneys (13);

characterized in that said mixing zone (B) is situated at the same level as the distribution zone (C) and also comprises at least one enclosure (16) for the exchange of the fluids, connected to, and communicating with, said mixing enclosure (15), said exchange enclosure (16) comprising at least one lateral passage section (17a, 17b) suitable for the passage of the fluids from said exchange enclosure (16) to said distribution zone (C).

2. Device according to claim 1, characterized in that said mixing enclosure (15) is situated above said exchange enclosure (16).

3. Device according to claim 1, characterized in that the cumulative total height H'2 of said mixing enclosure (15) and of said exchange enclosure (16) is comprised between 200 and 800 mm.

4. Device according to claim 1, characterized in that the width W of said exchange enclosure (16) is comprised between 200 and 800 mm.

5. Device according to claim 1, characterized in that the section of said mixing enclosure (15) and/or of said exchange enclosure (16) is a parallelogram.

6. Device according to claim 1, characterized in that the volume ratio between said exchange enclosure (16) and said mixing enclosure (15) is comprised between 5 and 60%.

7. Device according to claim 1, characterized in that the lateral passage sections (17a, 17b) are distributed over at least two levels.

8. Device according to claim 1, characterized in that said mixing enclosure (15) and said exchange enclosure (16) form a single piece.

9. Device according to claim 1, characterized in that it comprises a dispersal system of the fluids, arranged below said distribution plate (12), said dispersal system comprising at least one dispersal means (19) of the fluids.

10. Device according to claim 9, characterized in that said dispersal means (19) is a grid, the axis of said grid being perpendicular to the longitudinal axis of the enclosure of the reactor.

11. Device according to claim 1, characterized in that said mixing enclosure (15) is positioned between two exchange enclosures (16).

12. Device according to claim 1, characterized in that said mixing enclosure (15) comprises at least one deflecting means on at least one or more internal wall(s) of said mixing enclosure (15).

13. Device according to claim 1, characterized in that said exchange enclosure (16) comprises a plurality of horizontal passage sections suitable for the passage of the fluids from said exchange zone (16) to the distribution plate (12).

14. Device according to claim 1, characterized in that the enclosure or enclosures (15) and/or (16) closest to the distribution plate (12) is (are) situated at a distance "d" from said distribution plate (12) comprised between 20 and 150 mm.

15. Catalytic reactor with a downward flow comprising an enclosure (1) containing at least two fixed catalyst beds (2, 14) separated by an intermediate zone comprising a device for the mixing and distribution of fluids according to claim 1.

* * * * *